(12) United States Patent
Straney

(10) Patent No.: US 11,619,248 B1
(45) Date of Patent: Apr. 4, 2023

(54) UNIVERSAL CLAMPS

(71) Applicant: Robert Straney, Merritt Island, FL (US)

(72) Inventor: Robert Straney, Merritt Island, FL (US)

( * ) Notice: Subject to any disclaimer, the term of this patent is extended or adjusted under 35 U.S.C. 154(b) by 0 days.

(21) Appl. No.: 17/395,868

(22) Filed: Aug. 6, 2021

Related U.S. Application Data

(60) Provisional application No. 63/072,675, filed on Aug. 31, 2020.

(51) Int. Cl.
*F16B 2/12* (2006.01)
*F16M 13/02* (2006.01)

(52) U.S. Cl.
CPC ............. *F16B 2/12* (2013.01); *F16M 13/022* (2013.01)

(58) Field of Classification Search
CPC ................................. F16B 2/12; F16M 13/022
See application file for complete search history.

(56) References Cited

U.S. PATENT DOCUMENTS

| | | | |
|---|---|---|---|
| 1,777,884 A | 10/1930 | Horix | |
| 2,248,170 A | 7/1941 | Hansen | |
| 2,686,029 A | 8/1954 | Raymond | |
| 2,950,836 A * | 8/1960 | Murdock | ............ A24F 19/0092 297/188.2 |
| 3,269,683 A * | 8/1966 | Shinaver | ................. A63B 55/60 248/210 |
| 3,913,878 A | 10/1975 | Wayne | |
| 3,987,993 A | 10/1976 | Hopkins | |
| 4,256,281 A | 3/1981 | Harris et al. | |
| 4,270,724 A | 6/1981 | McMullen | |
| 4,878,642 A * | 11/1989 | Kirby, Jr. | .................. A47K 1/08 248/230.1 |
| 5,169,108 A * | 12/1992 | Carlson | ................... A47B 13/16 248/315 |
| 5,597,148 A | 1/1997 | Gospodarich | |
| 6,095,466 A | 8/2000 | Sener | |
| 6,227,510 B1 | 5/2001 | McMullen, Sr. | |
| 6,543,637 B1 * | 4/2003 | Osborn | .............. A47G 23/0216 220/737 |
| 6,719,254 B1 | 4/2004 | Speiser | |
| 6,719,255 B2 | 4/2004 | Chen | |
| 6,938,865 B1 | 9/2005 | Day | |

(Continued)

OTHER PUBLICATIONS

Roswell Wake-Air, Rope Hooks, product C910-0019, http:/www.roswellwakeair.com/series_elite/wakeboard_tower_rope_hooks/ Aug. 14, 2014.

*Primary Examiner* — Monica E Millner
(74) *Attorney, Agent, or Firm* — Brian S. Steinberger; Hilary F. Steinberger; Law Offices of Brian S. Steinberger, P.A.

(57) ABSTRACT

Universal clamps, assemblies, devices, apparatus and methods having a holder having a threaded rod extending therefrom with an outer end, a clamp member with a U shaped member extending to one side, a through hole for receiving the outer end of the threaded rod, wherein the U shaped member can be fit about a pipe and the holder can be attached to the pipe by rotating the holder so that the outer end of the threaded rod rests against a slide putting pressure on a side of the pipe. The components can be formed from marine grade UV (ultraviolet) resistant polymer material. The holders can include a single loop and a portable phone support.

11 Claims, 17 Drawing Sheets

(56) References Cited

U.S. PATENT DOCUMENTS

| | | | |
|---|---|---|---|
| 7,219,866 B2 | 5/2007 | Depay et al. | |
| 7,350,755 B1 | 4/2008 | Harrison | |
| 7,404,532 B1 | 7/2008 | Baril | |
| 8,128,045 B2 | 3/2012 | Skaggs | |
| 8,336,837 B2 | 12/2012 | Gephart et al. | |
| 8,453,373 B2 * | 6/2013 | Gordon | A01K 97/10 248/539 |
| 8,894,030 B2 * | 11/2014 | Nixon | B62J 11/04 248/220.21 |
| 9,194,407 B1 * | 11/2015 | Straney | F16B 2/06 |
| 9,677,594 B1 * | 6/2017 | Hemmerlin | F16M 13/02 |
| 10,470,536 B1 * | 11/2019 | Lundaas | A45B 3/00 |
| 10,531,755 B1 * | 1/2020 | Huang | F16B 2/12 |
| 2002/0109062 A1 * | 8/2002 | Fowler | B62J 11/04 248/311.2 |
| 2003/0197104 A1 * | 10/2003 | Heybl | B60N 3/108 248/314 |
| 2004/0104255 A1 * | 6/2004 | Trautman | B62J 11/04 224/413 |
| 2006/0043245 A1 * | 3/2006 | Baker | F16M 13/02 248/227.3 |
| 2006/0231723 A1 * | 10/2006 | Fayerman | A01K 97/10 248/229.15 |
| 2011/0302857 A1 | 12/2011 | McClellan et al. | |

* cited by examiner

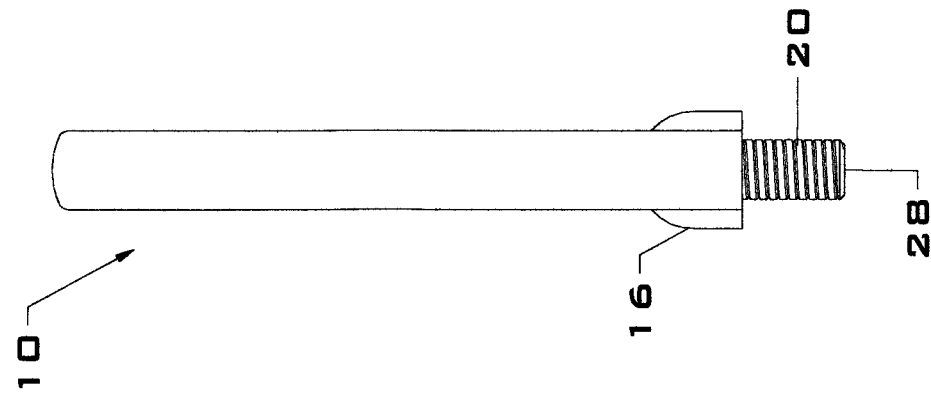
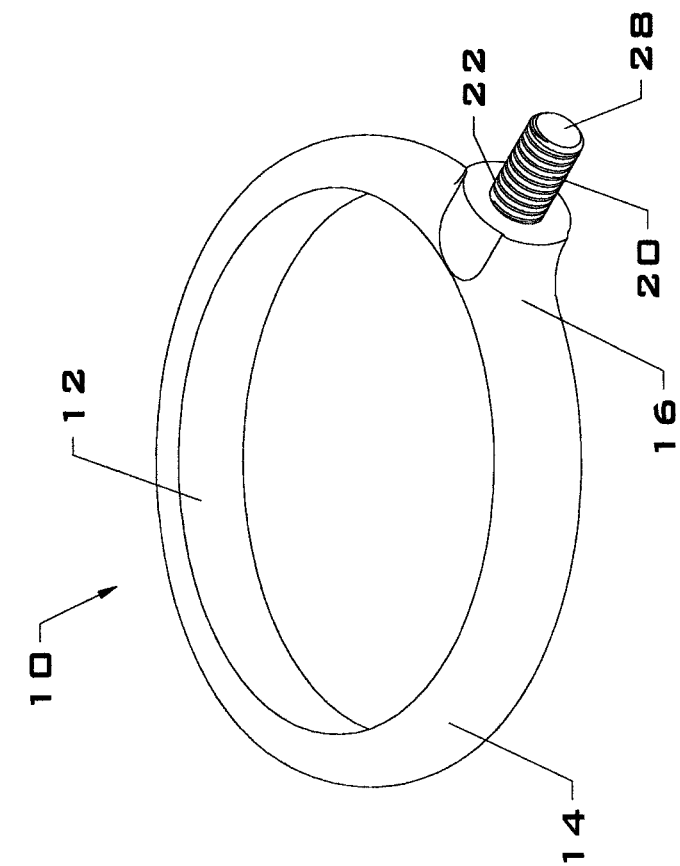
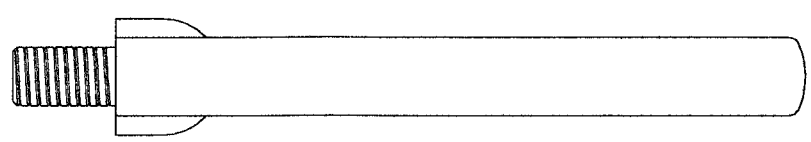

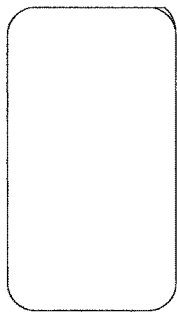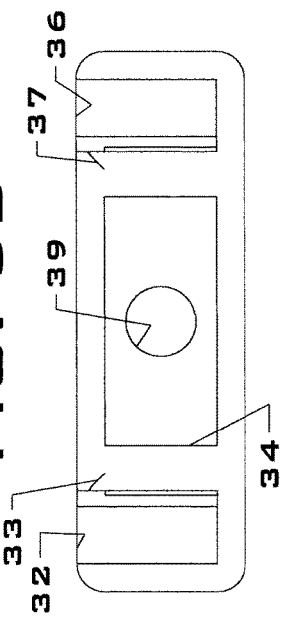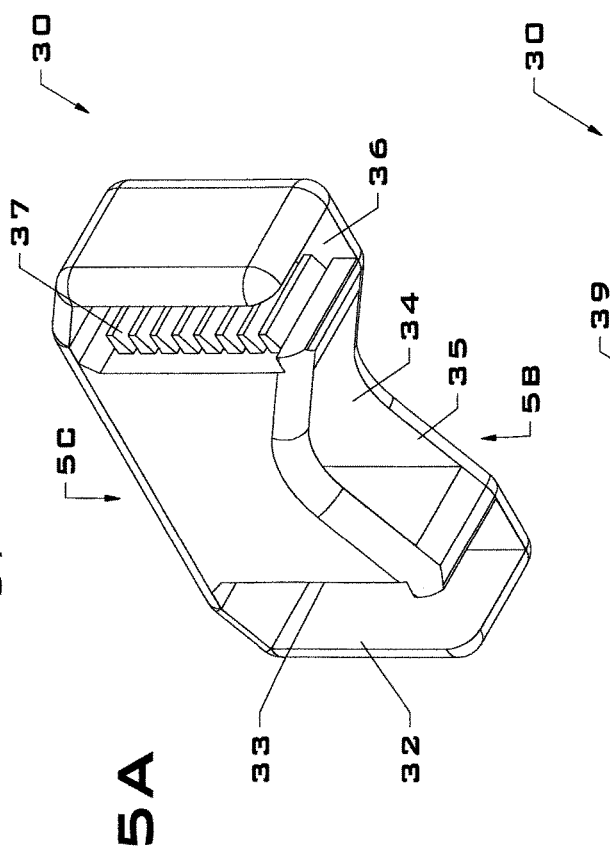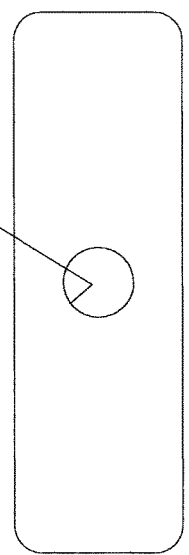

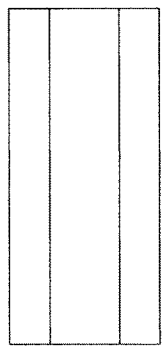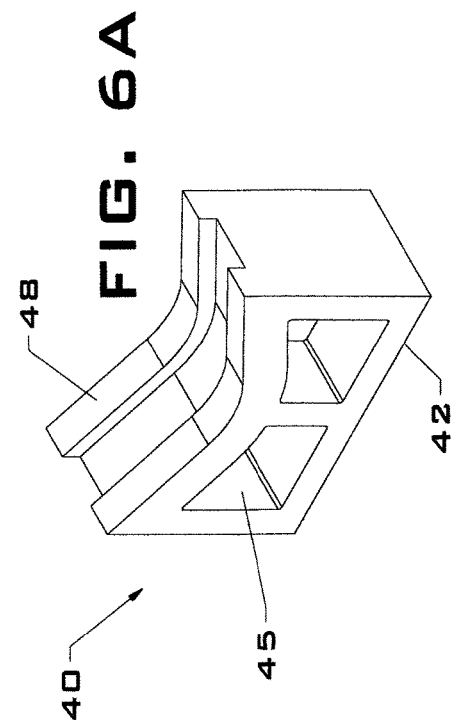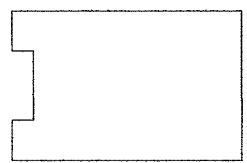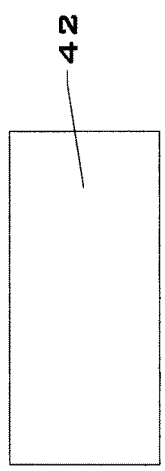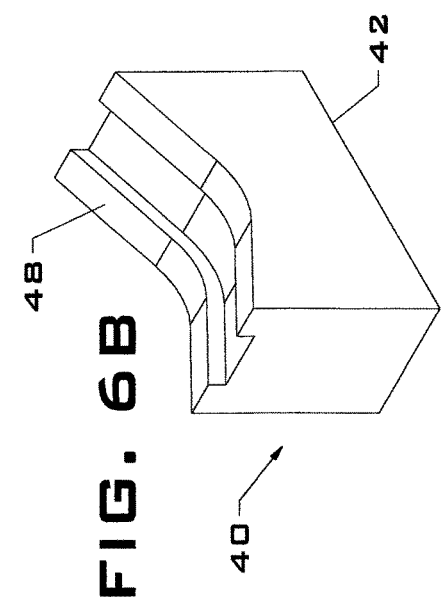

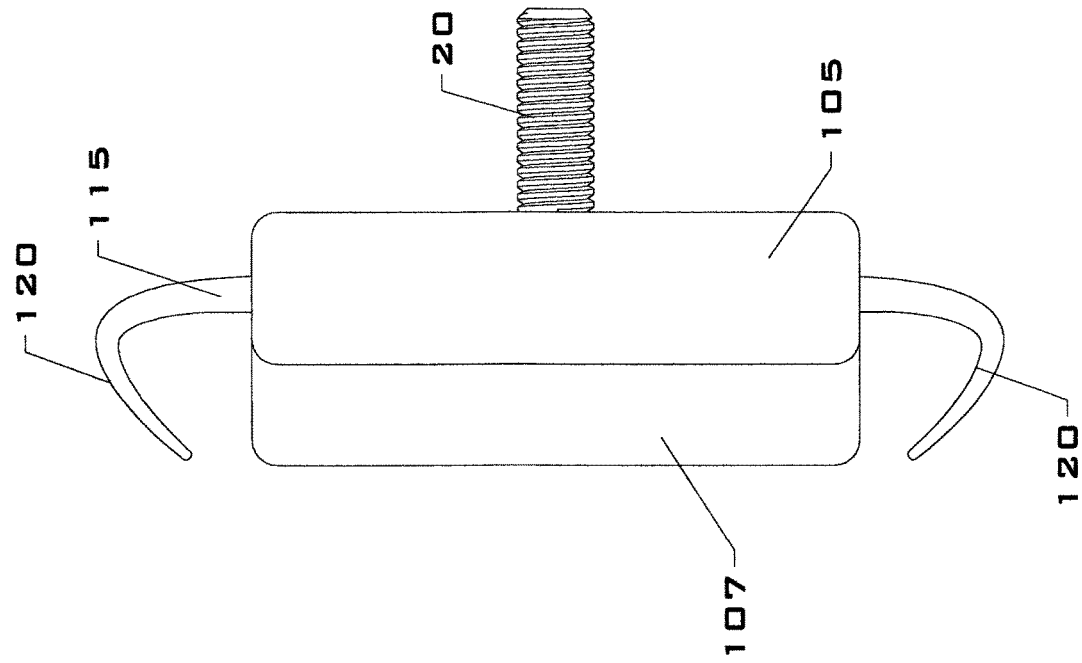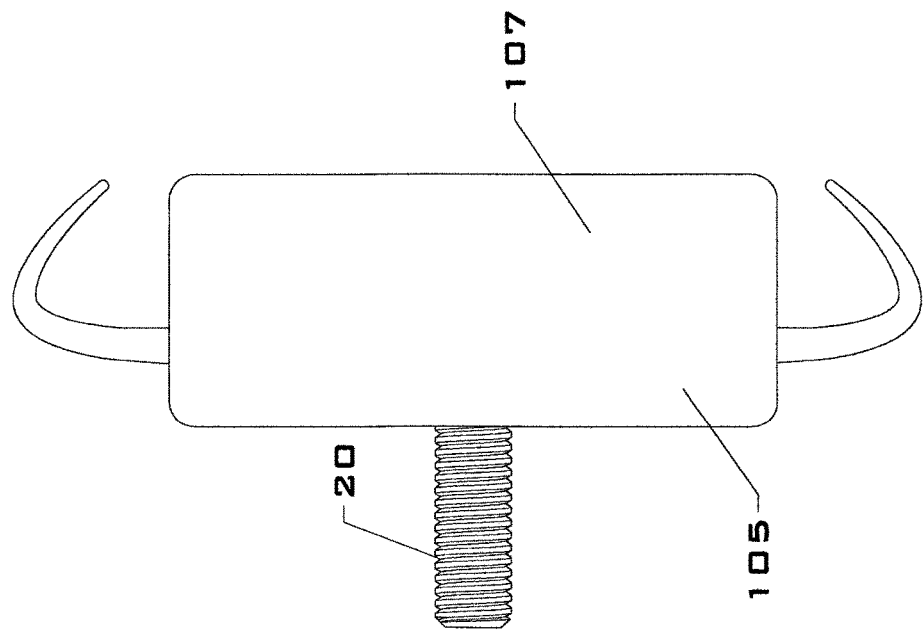

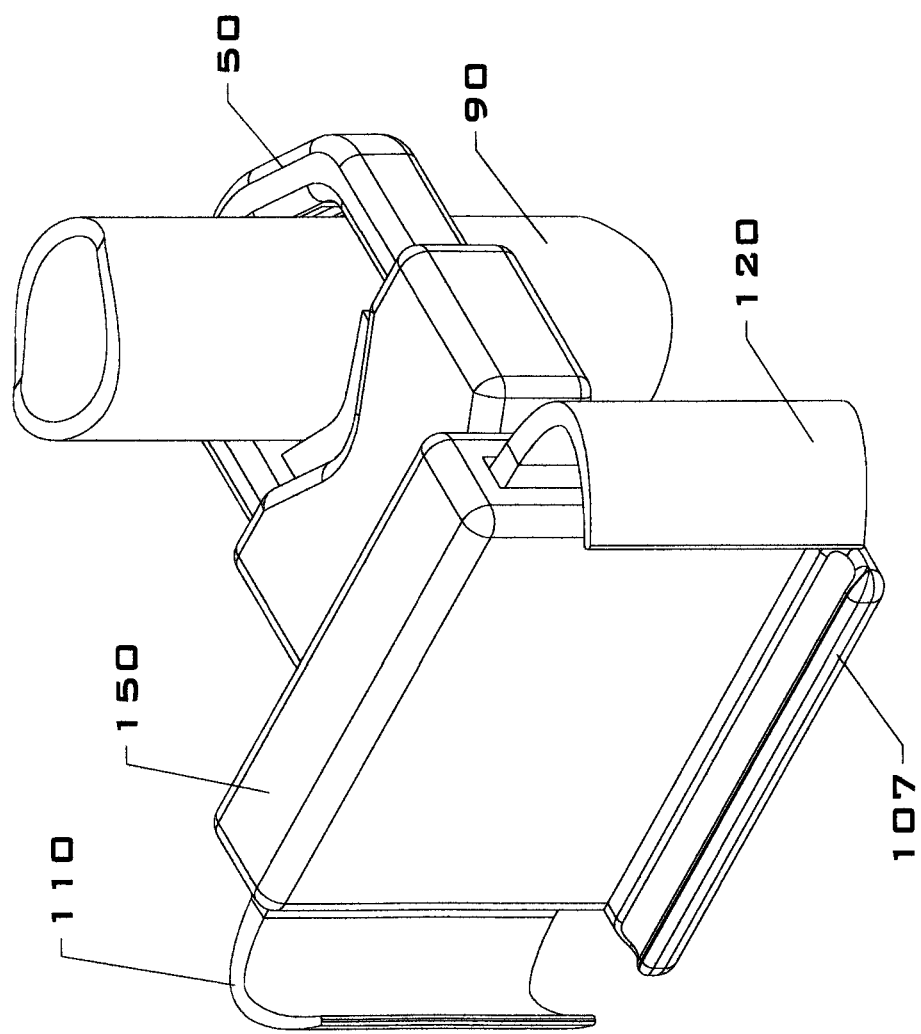

UNIVERSAL CLAMPS

This application claims the benefit of priority to U.S. Provisional Application Ser. No. 63/072,675 filed Aug. 31, 2020, the entire disclosure of which is incorporated by reference.

FIELD OF INVENTION

This invention relates to clamps for drink holders, portable phone holders and fishing rods, and in particular to novel universal clamps, devices, apparatus and methods having slidable clamp portions over U shaped legs on a holder, for clamping drink holders, portable phone holders, rod holders, utility holders, to any vertical, angled, and horizontal pipes, tubes, shafts, and the like, where the clamp is rotatable.

BACKGROUND AND PRIOR ART

Clamps used for supporting objects such as drinks and fishing rods, can cause damage to the surface of the structure being mounted, especially when the clamps are rotated about the structure.

Additionally, most clamps cannot be used as a universal holder for mounting around any vertical, horizontal, or angled pipes having the diameter range of ¾ inch to 2 inch outside diameter pipes, tubes, shafts, etc.

The inventors are not aware of any clamp that will fit ¾-inch OD (outer diameter) to 2-inch OD (outer diameter), and would be able to accommodate any angle of vertical, horizontal or angled pipe, tube, shaft, and the like.

Most clamps also require plural breakable parts, and are not UV (ultra violet) protected, which can fail under outdoor conditions over time.

The application is related to U.S. Pat. No. 9,194,407 to the same inventor as the subject patent application, which is incorporated by reference in its' entirety. The '407 patented clamp requires two threaded screws which requires extra parts and costs, Thus, the need exists for solutions to the above problems with the prior art.

SUMMARY OF THE INVENTION

A primary objective of the present invention is to provide novel universal clamps, assemblies, devices, apparatus and methods having a holder with a U shape which will attach to angled vertical and horizontal pipes and conduits. portions over U shaped legs on a holder, for clamping drink holders, rod holders, utility holders, a caddy or a shelf, and a portable phone, on any vertical, angled, and horizontal pipes, tubes, shafts, and the like.

A secondary objective of the present invention is to provide novel universal clamps, assemblies, devices, apparatus and methods versatile enough to accommodate the many different size pipes, tubes, shafts, and the like, that range from approximately ¾ inch outside diameter to approximately 2 inch outside diameter pipes, tubes, shafts, and the like, and accommodate any vertical, horizontal, angled pipe, tube, shaft, and the like.

A third objective of the present invention is to provide novel universal clamps, assemblies, devices, apparatus and methods that are made of UV (ultra violet) protected marine grade polymer.

A fourth objective of the present invention is to provide novel universal clamps, assemblies, devices, apparatus and methods that does not use breakable parts.

A fifth objective of the present invention is to provide novel universal clamps, assemblies, devices, apparatus and methods that does not ca A universal clamp can include a holder having a threaded rod extending therefrom with an outer end, a clamp member with a U shaped member extending to one side, a through hole for receiving the outer end of the threaded rod, wherein the U shaped member can be fit about a pipe and the holder can be attached to the pipe by rotating the holder so that the outer end of the threaded rod pushes a "V" shaped slide able insert against a side of the pipe.

The components can each be formed from a single UV (ultra violet) resistant material.

The UV (ultra violet) resistant material can be High-density polyethylene (HDPE) or calcium carbonate, poly-propylene with a UV inhibitor.

The threaded rod can be formed from metal, and the like.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 4A is a perspective view of the holding end (loop) of the preceding FIGS.

FIG. 4B is a left side view of the holding end (loop) of FIG. 4A.

FIG. 4C is a right side view of the holding end (loop) of FIG. 4A.

FIG. 5A is a lower perspective view of the clamp member in the clamp assembly of FIGS. 1-3.

FIG. 5B is a bottom view of the clamp member of FIG. 5A along arrow 5B.

FIG. 5C is a top view of the clamp member of FIG. 5A along arrow 5C.

FIG. 5D is a left side view and right side view of the clamp member of FIG. 5A.

FIG. 6A is a perspective view of the slidable insert in the clamp assembly of FIGS. 1-3.

FIG. 6B is a perspective view of the opposite side of the slidable insert of FIG. 6A.

FIG. 6C is a top side view of the slidable insert of FIGS. 6A-6B.

FIG. 6D is a bottom view of the slidable insert of FIGS. 6A-6B.

FIG. 6E is a left side view of the slidable insert of FIGS. 6A-6B.

FIG. 6F is a right side view of the slidable insert of FIGS. 6A-6B.

FIG. 11C is a bottom view of FIG. 11A.

FIG. 11D is a top view of FIG. 11A.

FIG. 13 is a perspective view of the assembled clamp assembly with the holding end embodiment of FIGS. 11A-11F holding a phone clamped to a pipe/conduit.

DESCRIPTION OF THE PREFERRED EMBODIMENTS

Figure 1:
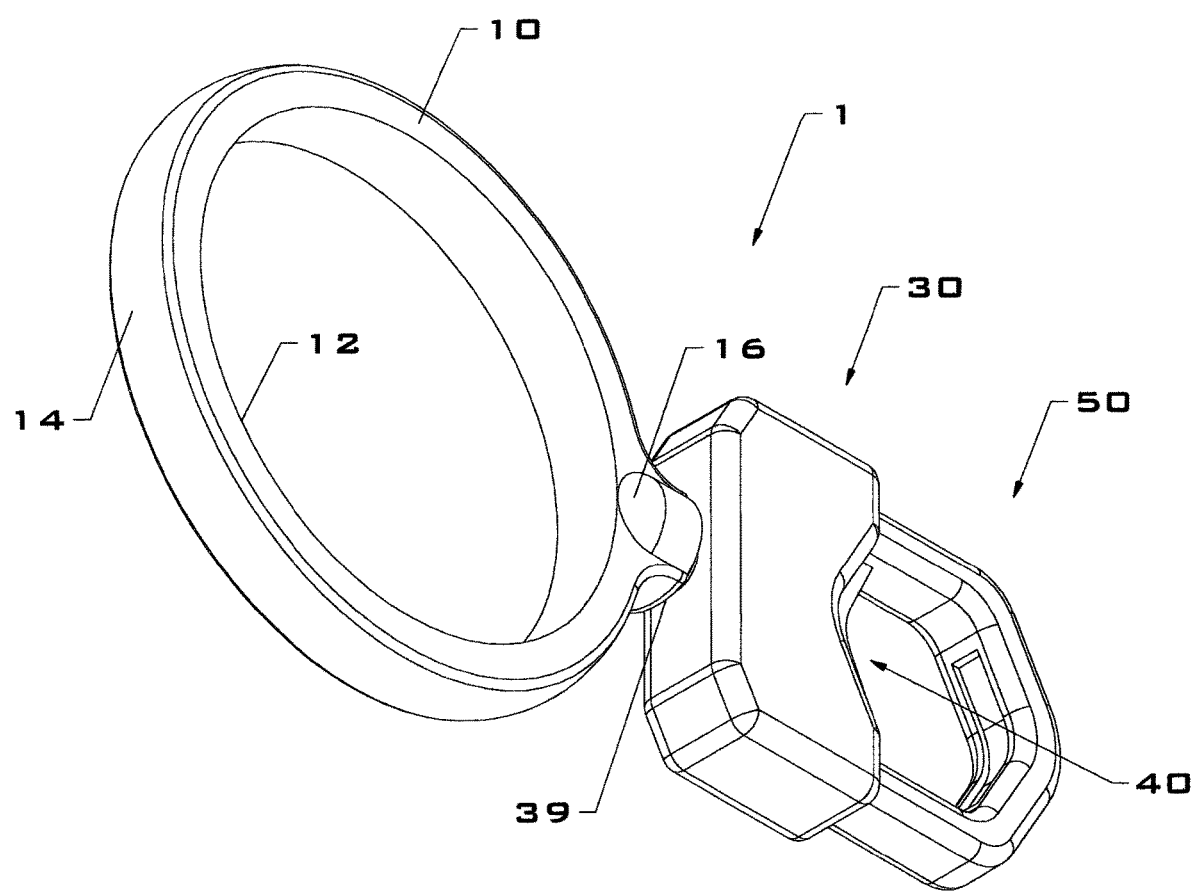
FIG. 1 is a perspective view of the assembled clamp assembly from the holding end (loop).

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A list of components will now be described.

1 improved universal clamp
10 holding end (loop)
12 inner loop
14 outer loop
16 stem
20 threaded rod or bolt
22 stem end
28 outer end
30 clamp member
32 first elongated cavity
33 first inner side teeth
34 middle cavity
35 open outer end
36 second elongated cavity
37 second inner side teeth
39 opening (for threaded rod or bolt 20)
40 slidable insert
42 flat base end
45 slots
48 V shape clamp end
50 U shaped member
52 first leg
53 first leg teeth
56 second leg
57 second leg teeth
80 cup
82 stepped side
90 pipe (conduit)
100 phone holder
105 base member
107 ledge
110 left side arm
115 elastic member between arms
120 right side arm
150 portable phone (smart phone)

Figure 2:
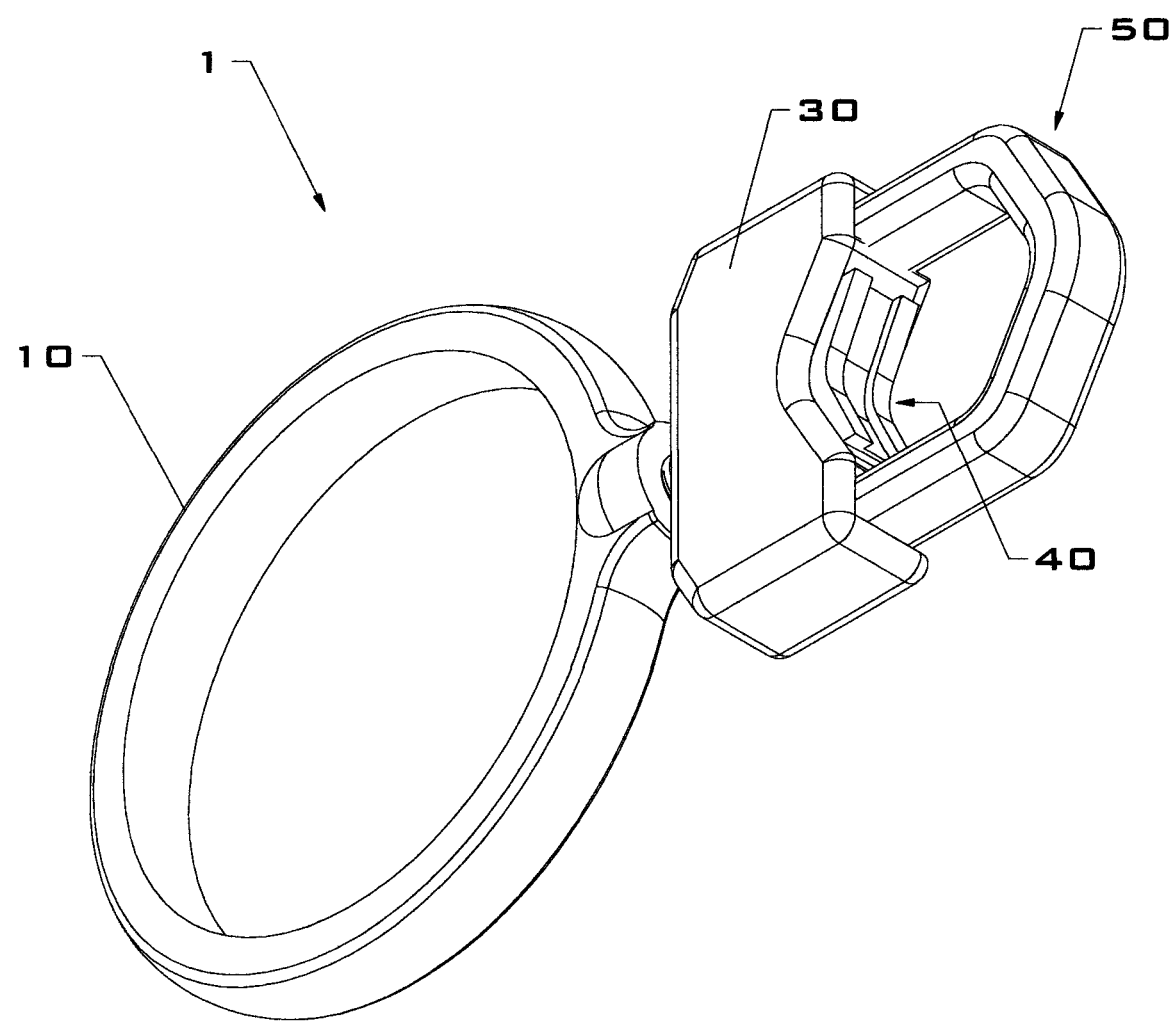
FIG. 2 is another side perspective view of the assembled clamp assembly of FIG. 1 from the U shaped member end.

FIG. 1 is a perspective view of the assembled clamp assembly 1 from the holding end (loop) 10. FIG. 2 is another side perspective view of the assembled clamp assembly 1 of FIG. 1 from the U shaped member end 50.

Figure 3:
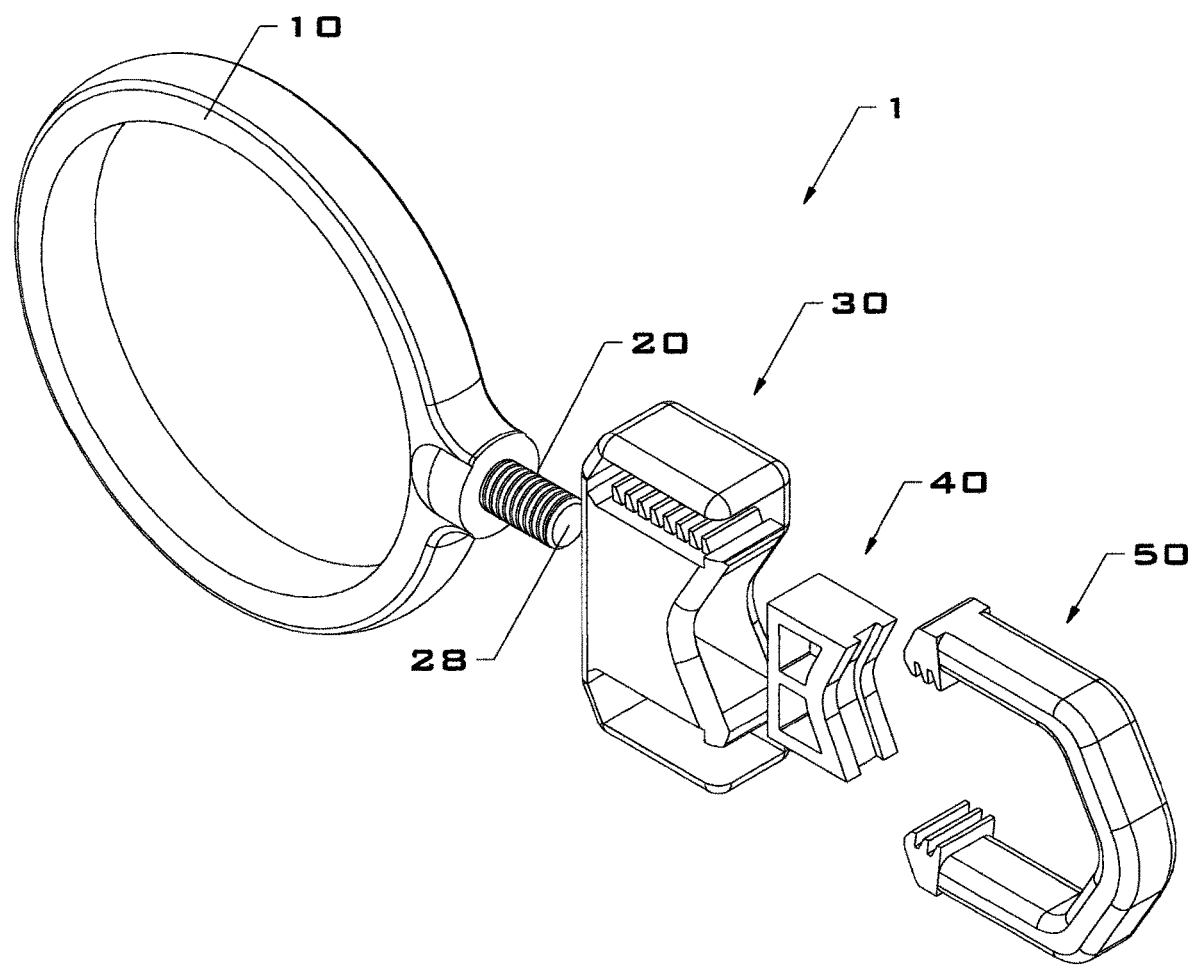
FIG. 3 is an exploded view of the clamp assembly of FIGS. 1-2.

FIG. 3 is an exploded view of the clamp assembly 1 of FIGS. 1-2.

FIG. 4A is a perspective view of the holding end (loop) 10 of the preceding FIGS. FIG. 4B is a left side view of the holding end (loop) 10 of FIG. 4A. FIG. 4C is a right side view of the holding end (loop) 10 of FIG. 4A.

Referring to FIGS. 1-4B, the assembly 1 includes a holding end (loop) 10 having an inner loop 12 and outer loop 14 with threaded rod or bolt 20 having a stem end 22 extending from a stem 16 of the holding end (loop) 10, a clamp member 30 with slidable insert 40, and a U shaped member 50. The outer end 28 of the threaded rod or bolt 20 passes through the opening 39 in the clamp member 30. to press against a flat base end 42 of the slidable insert 40 to be described in more detail later.

Referring to FIGS. 1-4B, the universal clamp 1 can include holding end (loop) 10, clamp member 30 slidable insert 40 and U-shaped member 50 that can each be formed from UV (ultraviolet) resistant polymer material, such as but not limited to High-density polyethylene (HDPE) or polyethylene high-density (PEHD) polymer. The material can be a polyethylene thermoplastic made from petroleum such as marine STARBOARD® by King Plastic Corporation of Florida.

The threaded rod or bolt 20 can be formed from metal, such as but not limited to stainless steel, and the like. Alternatively, rod or bolt 20 can be formed from the same material as the other components.

FIG. 5A is a lower perspective view of the clamp member 30 in the clamp assembly 1 of FIGS. 1-3. FIG. 5B is a bottom view of the clamp member 30 of FIG. 5A along arrow 5B. FIG. 5C is a top view of the clamp member 30 of FIG. 5A along arrow 5C. FIG. 5D is a left side view and right side view of the clamp member 3—of FIG. 5A.

Referring to FIGS. 5A-5D, the clamp member 30 on one side can have a first elongated cavity 32 with first inner side teeth 33, a second elongated cavity 36, with second inner side teeth 37, a middle cavity 34 with an open outer end 35, that can house the slidable insert 40 shown and described in FIGS. 6A-6F. The clamp member 30 can have an opening 39 running from the top of the insert and into the middle cavity 34.

FIG. 6A is a perspective view of the slidable insert 40 in the clamp assembly 1 of FIGS. 1-3. FIG. 6B is a perspective view of the opposite side of the slidable insert 40 of FIG. 6A. FIG. 6C is a top side view of the slidable insert 40 of FIGS. 6A-6B. FIG. 6D is a bottom view of the slidable insert 40 of FIGS. 6A-6B. FIG. 6E is a left side view of the slidable insert 40 of FIGS. 6A-6B. FIG. 6F is a right side view of the slidable insert 40 of FIGS. 6A-6B.

Referring to FIGS. 6A-6F, the slidable insert 40 can have a flat base end 42, slots 45 in a side, a top side having parallel rails forming a V shape 48.

The top side can have other shapes, such as but not limited to curved concave rounded, have ridges, ribs, and the like.

Figure 7C:
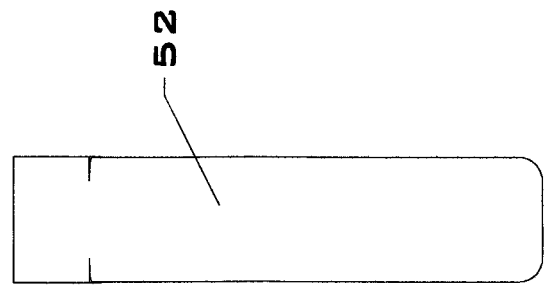
FIG. 7C is a right side view of the U shaped member of FIG. 7A.
Figure 7A:
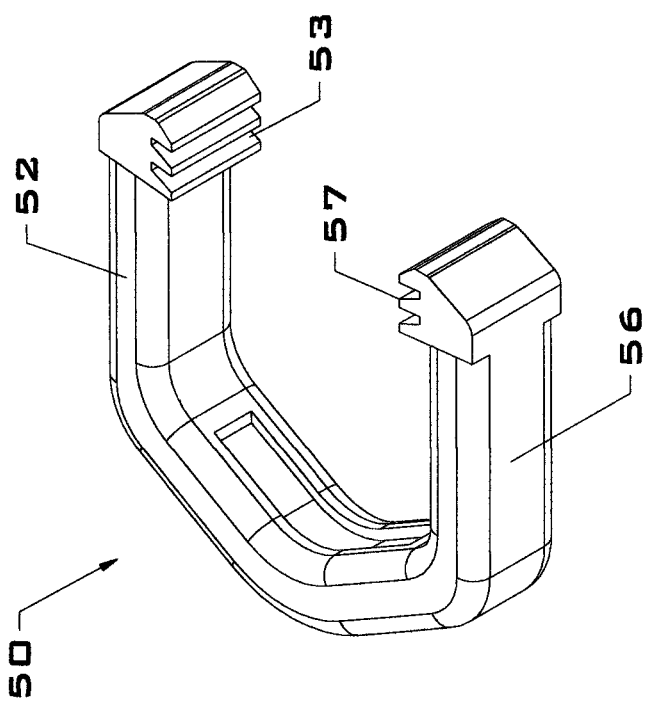
FIG. 7A is a perspective view of the U shaped member of the clamp assembly of FIGS. 1-3.
Figure 7B:
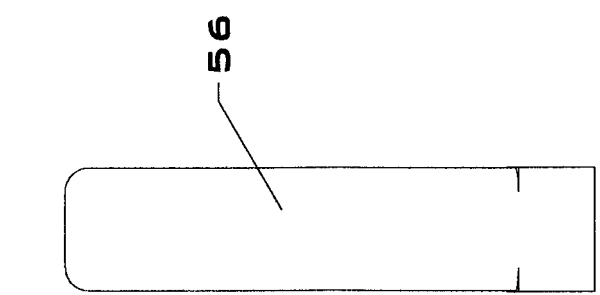
FIG. 7B is a left side view of the U shaped member of FIG. 7A.

FIG. 7A is a perspective view of the U shaped member 50 of the clamp assembly 1 of FIGS. 1-3. FIG. 7B is a left side view of the U shaped member 50 of FIG. 7A. FIG. 7C is a right side view of the U shaped member 50 of FIG. 7A.

Referring to FIGS. 7A-7C, the U shaped member can have a first leg 52 with first leg teeth 53 on an inner lower surface, a second leg 56 with second leg teeth 57 on an inner lower surface.

Figure 8A:
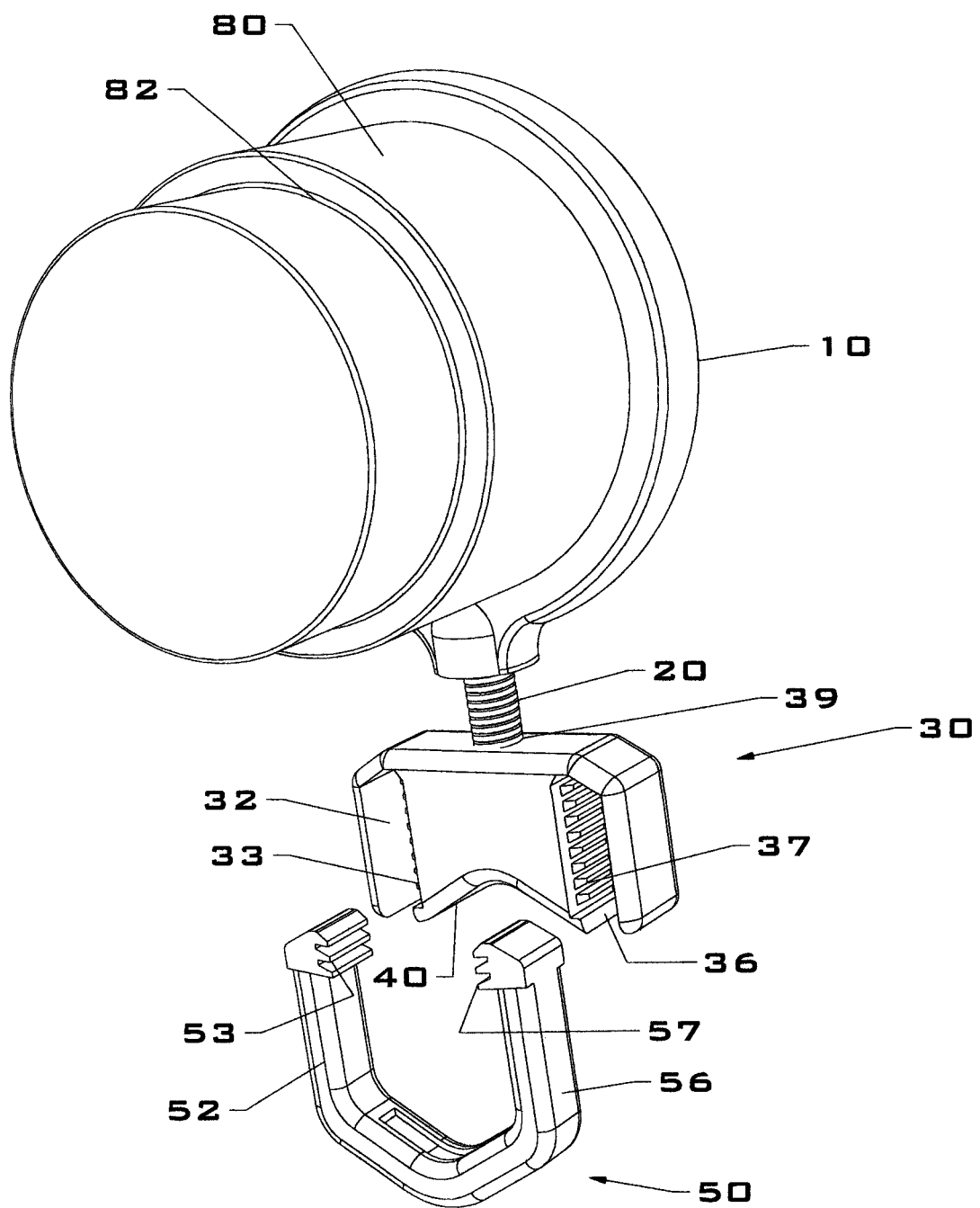
FIG. 8A is a perspective view of the cup inserted into the holding end (loop) of the preceding figures and insert cup with the legs of the U shaped member about to be positioned into the clamp member of the preceding figures.

FIG. 8A is a perspective view of the cup 80 inserted into the holding end (loop) 10 of the preceding figures with the legs 52, 56 of the U shaped member 50 about to be positioned into the first elongated cavity 32 and second elongated cavity 36 of the clamp member 30 of the preceding figures.

In a preferred embodiment, a cup 80 having funnel shape with stepped side 82 can be snugly fit into the inner loop 12 of the holding end (loop) 12. The outer end 28 of the threaded rod 20 can be rotatably threaded into the opening 39 of the clamp member 30, which can have the slidable insert 40 snugly inside the middle cavity 34.

An assembler/installer can grip the U shaped member 50 and position first leg 52 and second leg 56 with first leg teeth 53 and second leg teeth 57 over the first elongated cavity 32 and second elongated cavity 36.

Figure 8B:
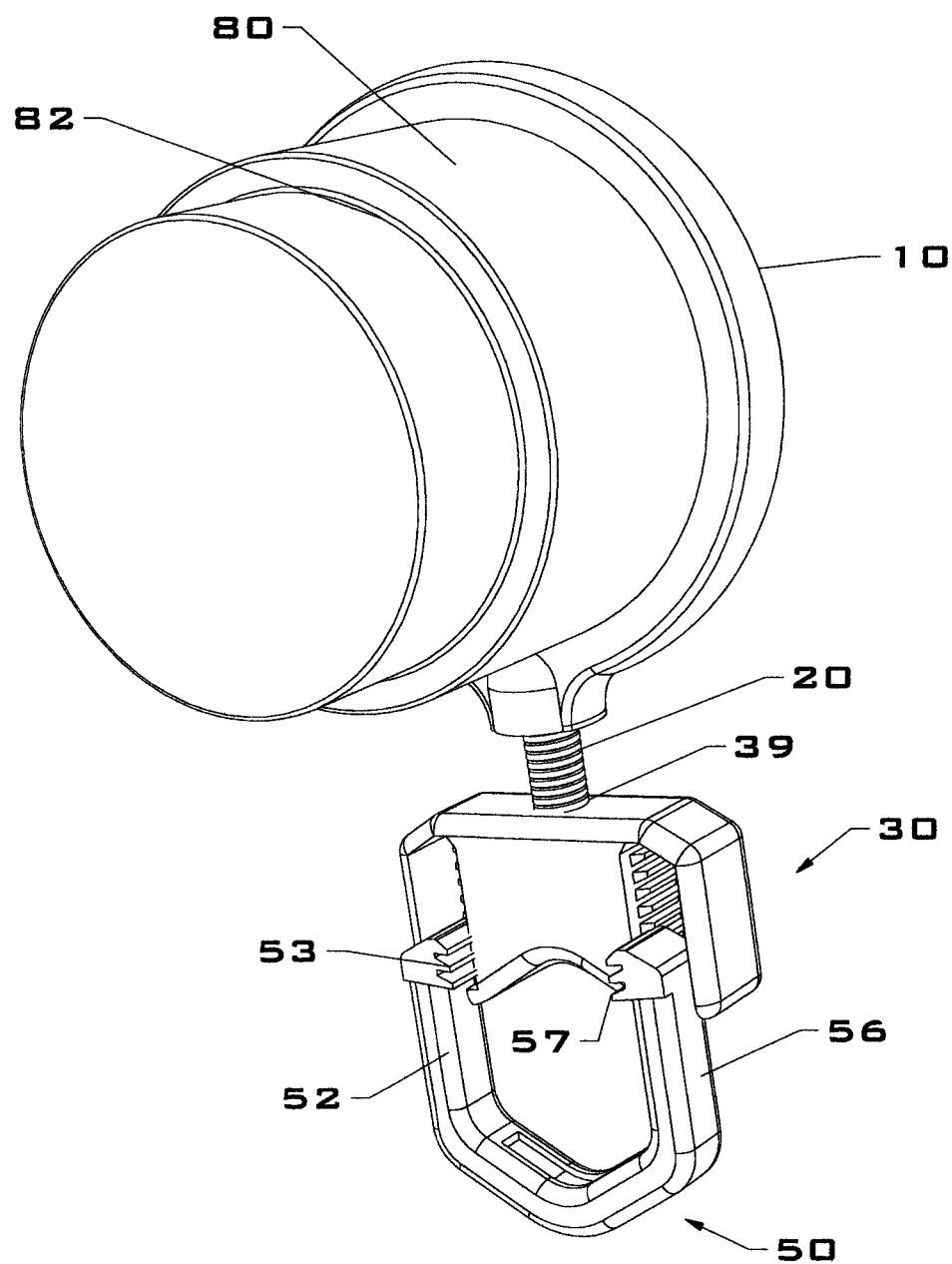
FIG. 8B is another perspective view of FIG. 8A with the first leg teeth and second leg teeth of the legs of the U shaped member being inserted into the first and second elongated cavities of the clamp member.

FIG. 8B is another perspective view of FIG. 8A with the first leg teeth and second leg teeth of the legs of the U shaped member being inserted into the first elongated cavity 32 and second elongated cavity 36 of the clamp member 30 so that portions of the first leg teeth 53 and second leg teeth 57 fit into grooves formed in the first inner side teeth 33 and second inner side teeth 37 in the respective elongated cavities 32 and 36.

Figure 8C:
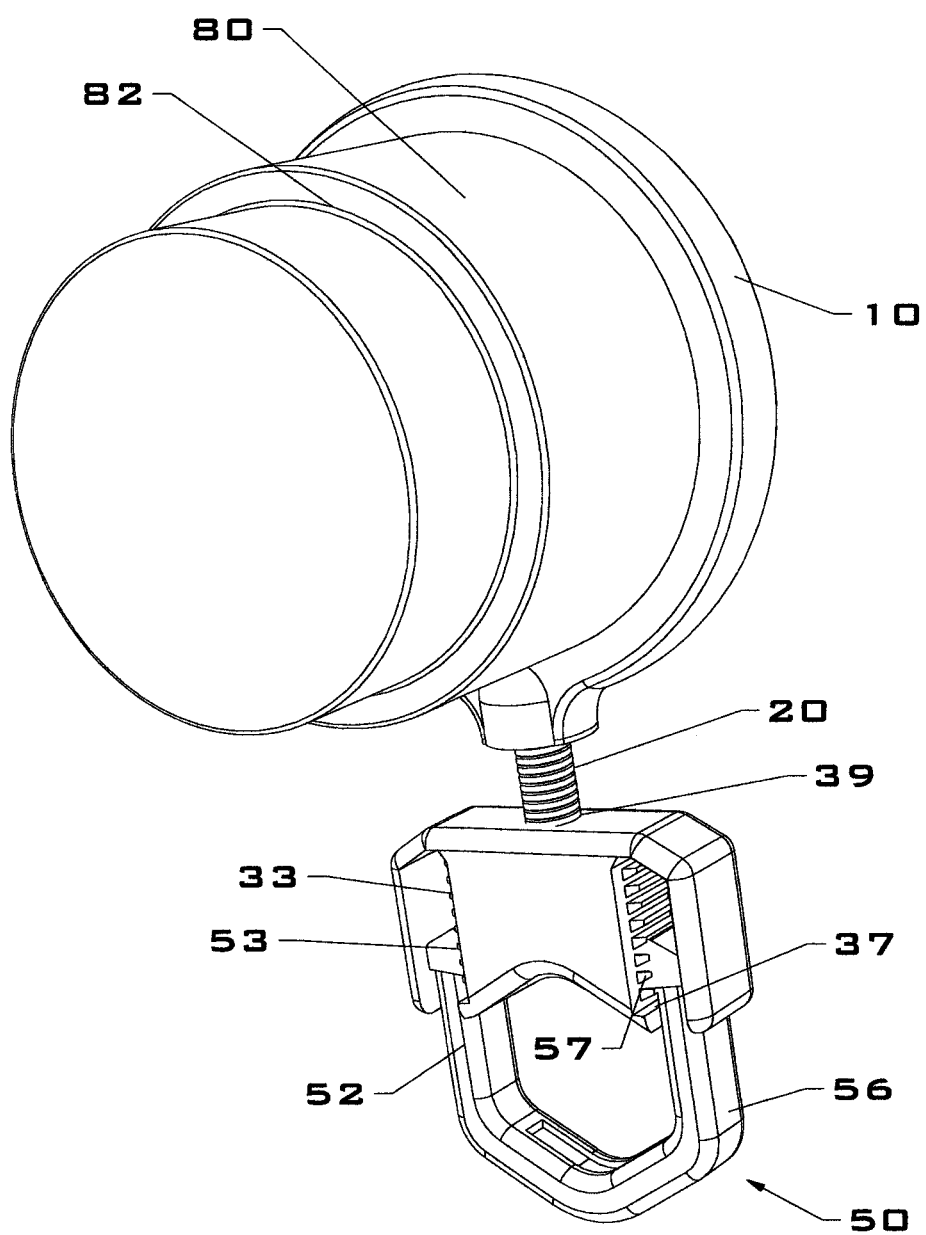
FIG. 8C is another perspective view of FIGS. 8A-8B with the first leg teeth and second leg teeth of the legs of the U shaped member inserted into the first and second elongated cavities of the clamp member.

FIG. 8C is another perspective view of FIGS. 8A-8B with the first leg teeth 53 and second leg teeth 57 of the legs 52, 56 of the U shaped member 50 inserted into the first and second elongated cavities 32, 36 of the clamp member 30.

Referring to FIGS. 1-8C, the holding end (loop) 10 with or without the inserted cup 80 can be used to support beverages (such as but not limited to bottles, cans, insulated containers), fishing rods, tools, and the like, therein.

Figure 9A:
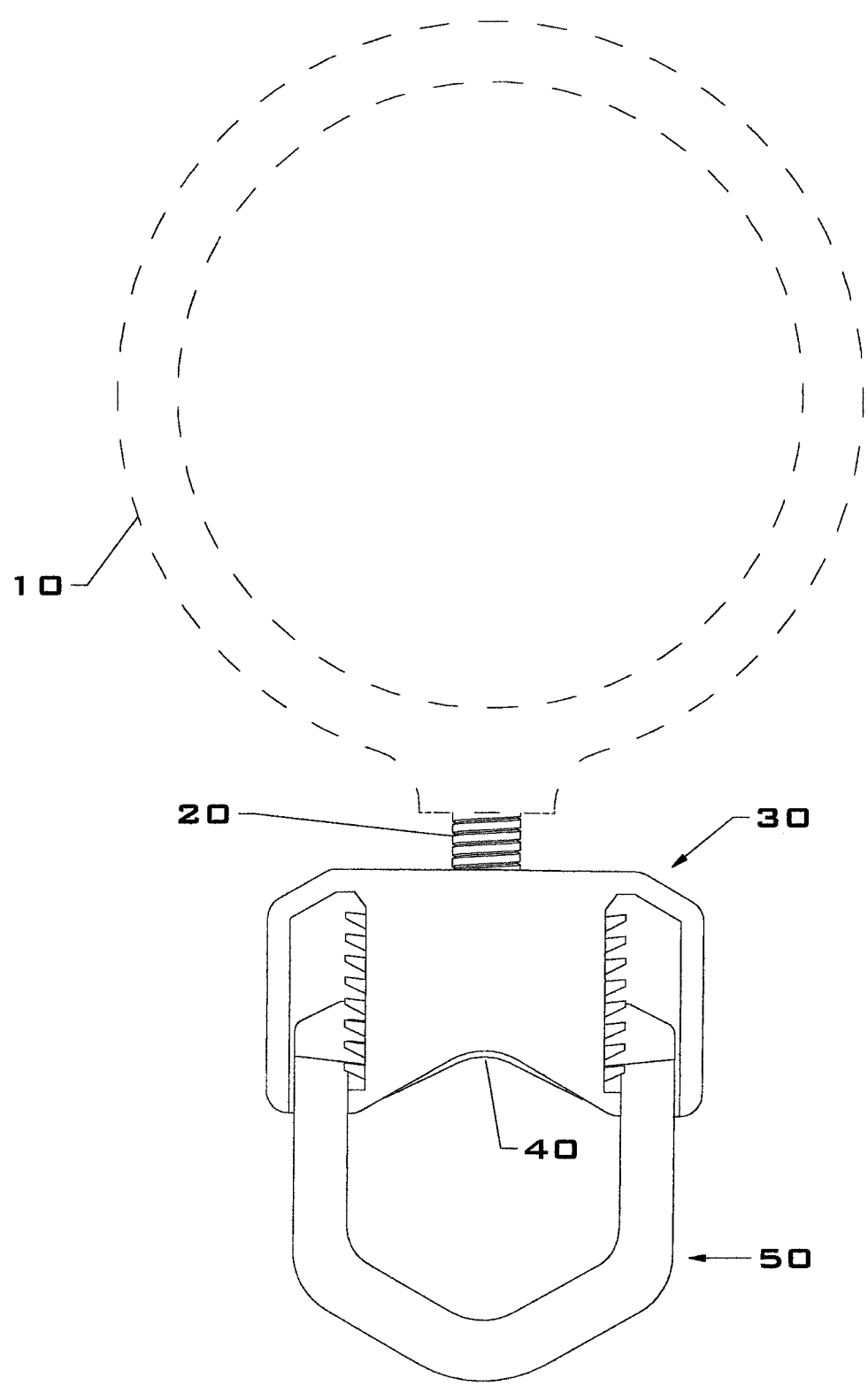
FIG. 9A is a bottom view of FIG. 8A showing the assembled clamp assembly of FIGS. 1-2, 8C.

FIG. 9A is a bottom view of FIG. 8A showing the assembled clamp assembly 1 of FIGS. 1-2, 8C. The assembler/installer can take the assembled clamp assembly 1 and position it around or over the end of a pipe (conduit) 90.

Alternatively, the assembler/installer can assemble the clamp assembly 1 about sides of a pipe (conduit) 90.

Figure 9C:
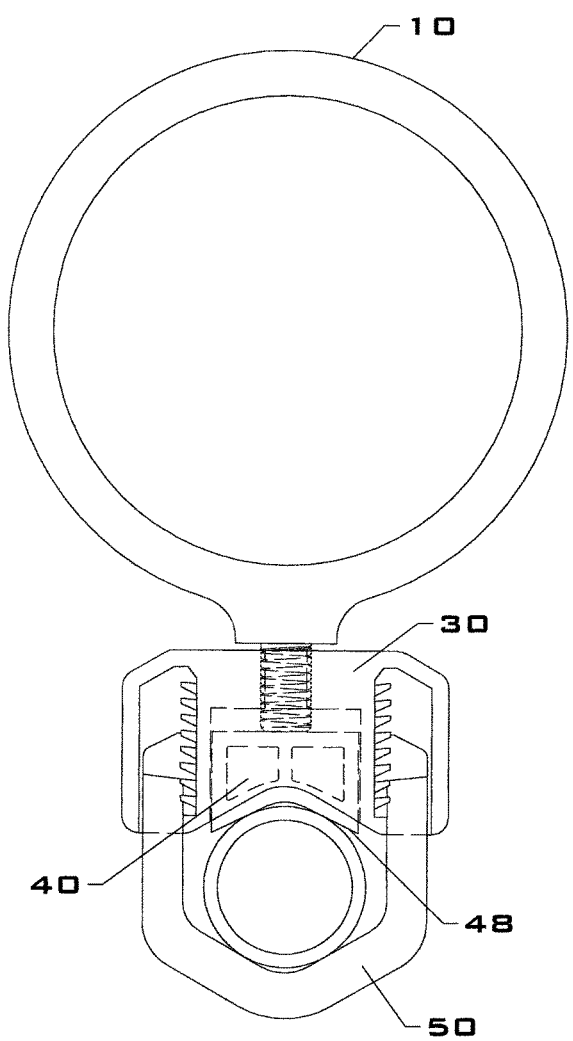
FIG. 9C is another bottom view of FIG. 9B with the slidable insert now pushed against the pipe (conduit).
Figure 9B:
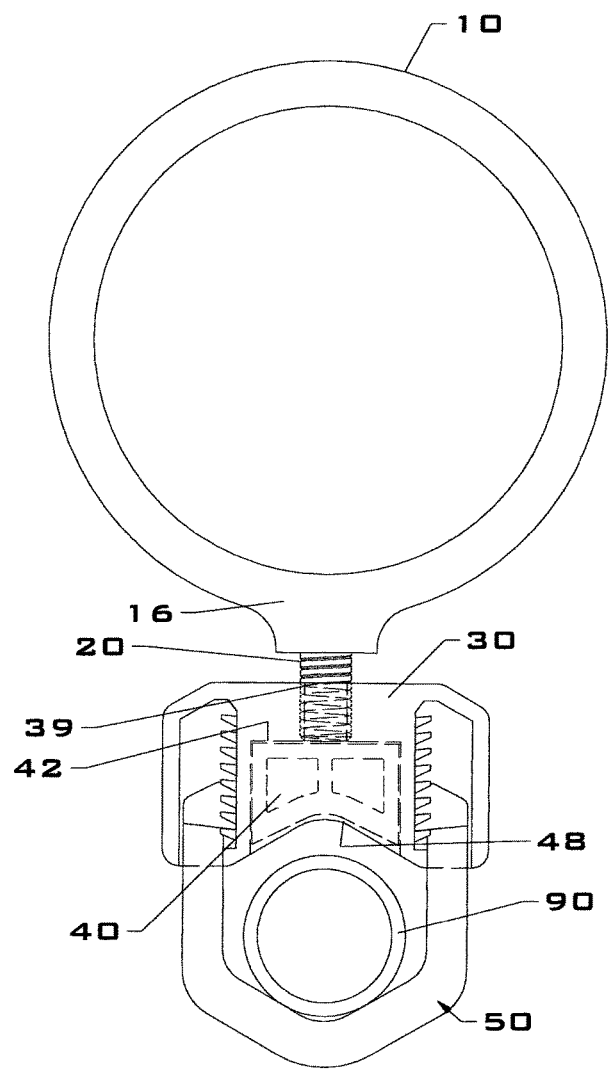
FIG. 9B is another bottom view of FIG. 9A with the holding end (loop) being rotated to move the threaded rod against the slidable insert to be pushed against a pipe (conduit).

FIG. 9B is another bottom view of FIG. 9A with the holding end (loop) 10 started to being rotated to move the outer end 28 of the threaded rod 20 against the slidable insert 40 to be pushed against a pipe (conduit) 90. The assembler/installer can rotate the holding end (loop) 10 clockwise to thread within the opening 39 of the clamp member 30 to push against the flat base end 42 of the slidable insert to push it outward.

FIG. 9C is another bottom view of FIG. 9B with the V shaped clamp end 48 of the slidable insert 40 now pushed against the pipe (conduit) 90, effectively locking the clamp assembly to the pipe (conduit) 90.

Figure 10:
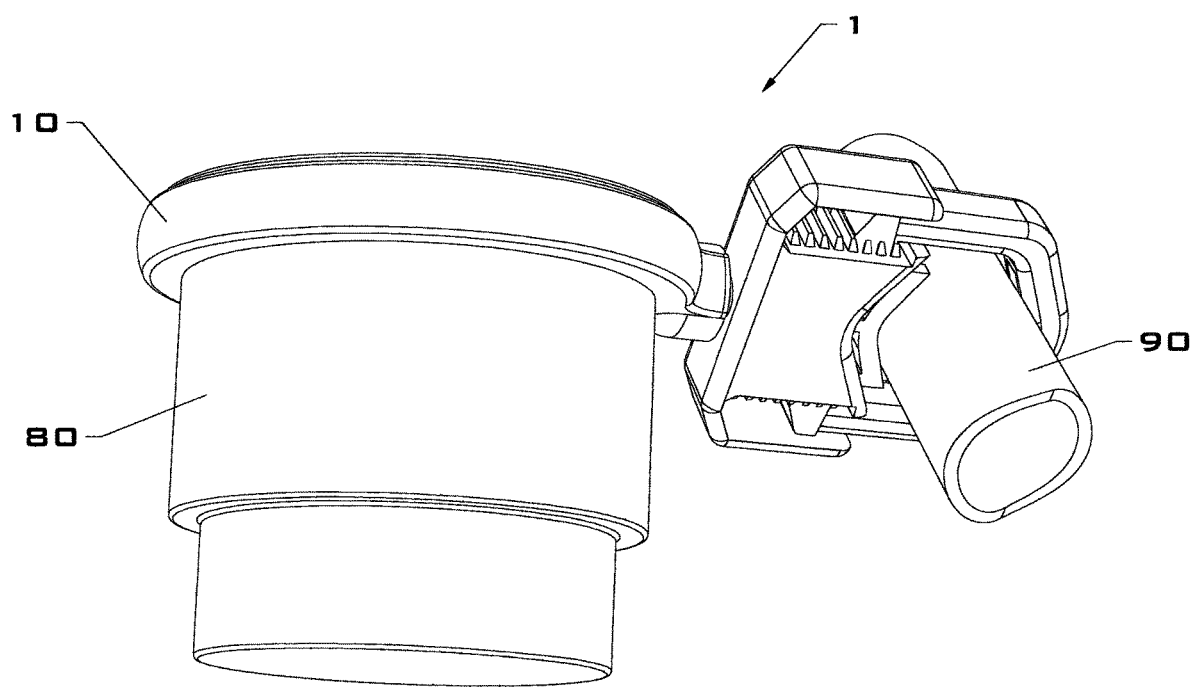
FIG. 10 a lower perspective view of the assembled clamp assembly with inserted cup of FIG. 8C clamped about a pipe (conduit).

FIG. 10 a lower perspective view of the assembled clamp assembly 1 with inserted cup 80 of FIG. 8C clamped about a pipe (conduit) 90.

Figure 11B:
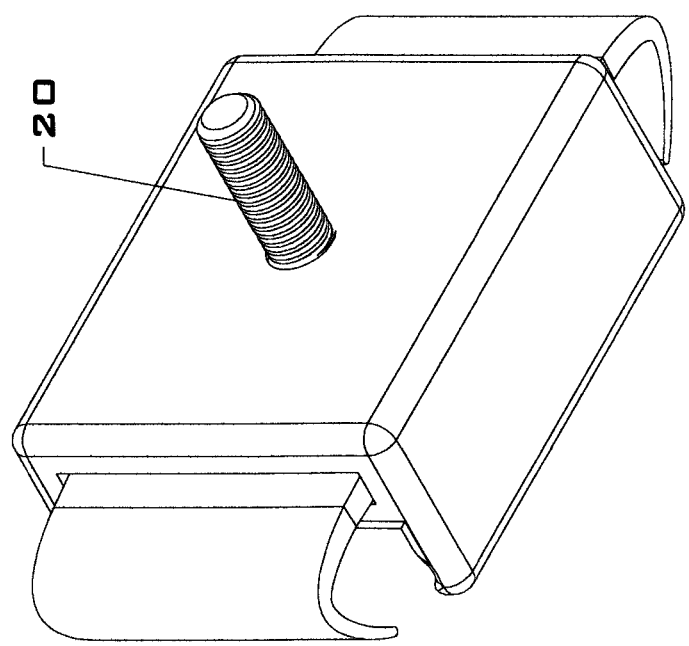
FIG. 11B is a rear perspective view of FIG. 11A.
Figure 11A:
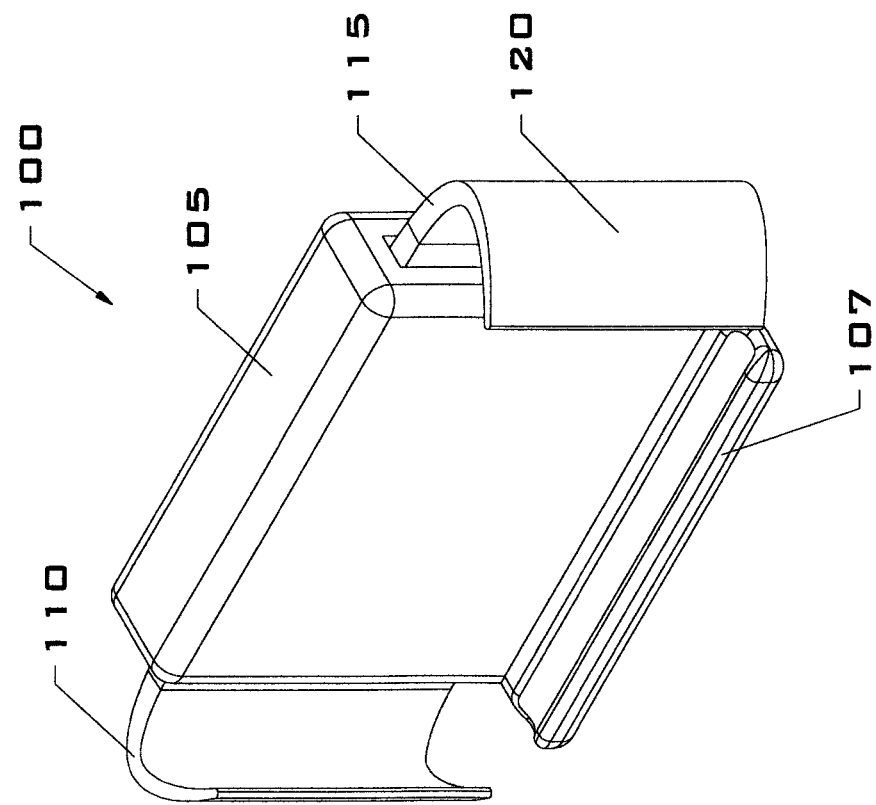
FIG. 11A is a front perspective view of another embodiment of the assembled clamp assembly with a portable phone holder.

FIG. 11A is a front perspective view of another embodiment of the assembled clamp assembly 1 with a portable phone holder 100. FIG. 11B is a rear perspective view of FIG. 11A. FIG. 11C is a bottom view of FIG. 11A. FIG. 11D is a top view of FIG. 11A.

Referring to FIGS. 11A-11C, the portable phone holder 100 can include a base member 105 with ledge 107 formed from same materials referenced above. A left side arm 110 can have a C shape end, and a right side arm 120 also having a C shape end can be attached to one another by an elastic member 115 that passes through a slot opening in the base member 105. The C shaped ends can be biased toward one another by the elastic member 115. The threaded member 20 can extend rearward from the base member 105.

Figure 12:
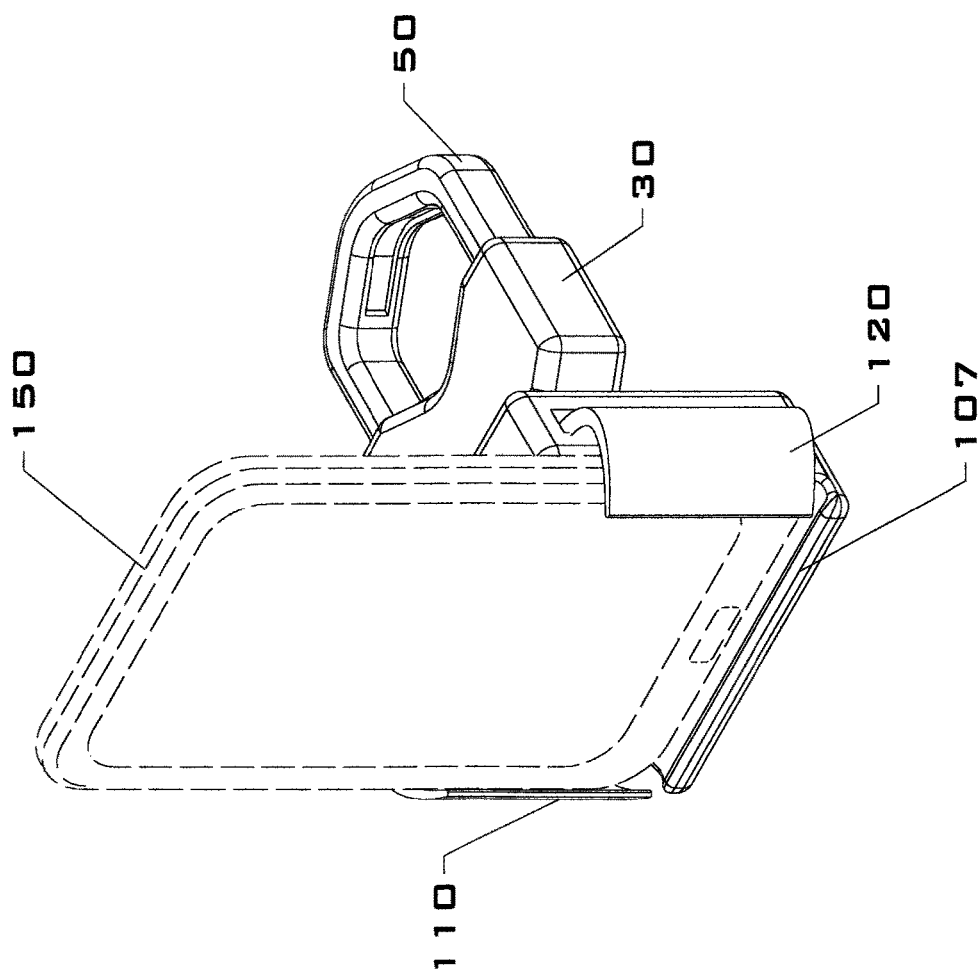
FIG. 12 is a perspective view of an assembled clamp assembly with the holding end embodiment of FIGS. 11A-11F, holding a portable phone.

FIG. 12 is a perspective view of an assembled clamp assembly with the holding end embodiment 100 of FIGS. 11A-11F, holding and supporting a portable phone 150.

FIG. 13 is a perspective view of the assembled clamp assembly with the holding end embodiment 100 of FIGS. 11A-11F holding a phone 150 clamped to a pipe/conduit 90.

The invention can further include gripping rubber seals as needed to be wrapped about the support, such as pipe in order to keep the clamp 1 from spinning about the support, such as the pipe. Rubber seals can be used when desired to keep the clamp end from spinning relative to the underlying support.

The assembled universal clamp assemblies 1, 100 of the preceding figures can be used for attachment to a large and small diameter support, such as any vertical, angled, and horizontal pipes, tubes, shafts, and the like.

Additionally, the threaded rod 20 will allow the holding end (loop) 10 to be able to further rotated to pivot relative to the U shaped member 50 which is clamped about a pipe (conduit) 90.

The polymer plastic material that can be used in the invention allows for the clamp assemblies 1, 100 to be rotatable 360 degrees about various supports without causing any damage to the supports, such as such as any vertical, angled, and horizontal pipes, tubes, shafts, and the like, where the supports can range from approximately 3/4 inch to approximately 2 inches.

A method of making the clamp assemblies 1, 100, can include the steps of taking a rectangular piece of UV (ultraviolet) resistant polymer material, such as but not limited to High-density polyethylene (HDPE) or polyethylene high-density (PEHD) polymer. The material can be a polyethylene thermoplastic made from petroleum such as marine STARBOARD® by King Plastic Corporation of Florida.

While polymer plastic is described, the invention can be formed from other materials, such as but not limited to other types of hard plastic, that can be cut, or molded, other types of polymers, as well as using metals, such as but not limited to stainless steel, treated aluminum, galvanized steel, and the like. A nonmetal spacer, separator can be used inside the clamping end to protect a metal version of the universal clamp from damage and electrolysis, and the like.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A clamp for griping about a pipe to support objects, comprising:
    a holder having a threaded rod extending therefrom with an outer end; and
    a member having a U shape extending to one side, a through-hole in the member for receiving the outer end of the threaded rod, the member includes parallel elongated cavities, each with interior teeth surfaces, wherein the U shape is fit attached to a pipe by rotating the holder so that the outer end of the threaded rod rests against a side of the pipe, wherein the U shape includes:
    two legs, each having teeth portions for interconnecting with respective teeth surfaces of the parallel elongated cavities.

2. A clamp for griping about a pipe to support objects, comprising:
    a holder having a threaded rod extending therefrom with an outer end; and
    a member with a first side facing in one direction and a second side facing in an opposite direction to the first side, the first side having a single through-hole passing through a midportion from the first side to the second side, the single through-hole for threadably receiving the outer end of the threaded rod, the second side of the member having parallel elongated cavities spaced about a middle cavity which is adjacent to the single through-hole;
    a slidable insert in the middle cavity; and
    a U shape having legs which attach to the parallel elongated cavities by interconnecting teeth, wherein rotating the threaded rod allows the outer end to push against the slidable insert to close a space formed in the U shape, so that the clamp is attachable about a pipe by the slidable insert pushing against one side of the pipe in the U shape.

3. The universal clamp assembly of claim 2, wherein the holder includes a loop.

4. The universal clamp assembly of claim 3, further comprising:
    a cup for being inserted into the loop.

5. The universal clamp assembly of claim 2, wherein the slidable insert includes a generally V shaped end which abuts against the side of the pipe.

6. A universal clamp assembly, comprising:
    a holder having a threaded rod extending therefrom with an outer end;
    a clamp member with a U shaped member extending to one side, a through-hole for receiving the outer end of the threaded rod, wherein the U shaped member is fit about a pipe and the holder is attached to the pipe by rotating the holder so that the outer end of the threaded rod rests against a slide insert putting pressure on a side of the pipe, wherein the clamp member includes parallel elongated cavities, each with interior teeth surfaces, and wherein the U shaped member includes two legs, each having teeth portions for interconnecting with respective teeth surfaces of the parallel elongated cavities.

7. The universal clamp assembly of claim 6, wherein the slide insert includes a generally V shaped end which abuts against the side of the pipe.

8. The universal clamp assembly of claim 7, further comprising:
    a cup for being inserted into a loop.

9. The universal clamp assembly of claim 2, wherein the holder with the U-shape are each formed from a single UV (ultra violet) resistant material.

10. The universal clamp assembly of claim 9, wherein the UV (ultra violet) resistant material includes High-density polyethylene (HDPE).

11. The universal clamp assembly of claim 8, wherein the loop is formed from plastic, and the threaded rod is formed from metal.

\* \* \* \* \*